(12) United States Patent
Descubes et al.

(10) Patent No.: US 9,206,859 B2
(45) Date of Patent: Dec. 8, 2015

(54) MECHANICAL PROTECTION DEVICE

(75) Inventors: Olivier Pierre Descubes, Nay (FR); Olivier Bedrine, Bosdarros (FR); Isabelle Germaine Claude Ladeveze, Nousty (FR); Jean-Michel Pierre Claude Py, Pardies Pietat (FR)

(73) Assignee: TURBOMECA, Bordes (FR)

( * ) Notice: Subject to any disclaimer, the term of this patent is extended or adjusted under 35 U.S.C. 154(b) by 0 days.

(21) Appl. No.: 14/113,138

(22) PCT Filed: Apr. 12, 2012

(86) PCT No.: PCT/FR2012/050800
§ 371 (c)(1),
(2), (4) Date: Oct. 21, 2013

(87) PCT Pub. No.: WO2012/143656
PCT Pub. Date: Oct. 26, 2012

(65) Prior Publication Data
US 2014/0045599 A1    Feb. 13, 2014

(30) Foreign Application Priority Data

Apr. 22, 2011    (FR) ..................................... 11 53523

(51) Int. Cl.
*F16D 9/08*    (2006.01)
*F16D 9/06*    (2006.01)
(Continued)

(52) U.S. Cl.
CPC ................ *F16D 9/06* (2013.01); *F04D 13/021* (2013.01); *F04D 13/022* (2013.01);
(Continued)

(58) Field of Classification Search
CPC ... F04D 13/021; F04D 13/022; F04D 27/008; F04D 29/05; F16D 9/00; F16D 9/06; F16D 9/08; F16D 9/10; F16D 2127/002

USPC .......................................... 464/32, 33; 403/2
See application file for complete search history.

(56) References Cited

U.S. PATENT DOCUMENTS 3,237,741 A * 3/1966 Potter et al. ................ 192/116.5
4,185,477 A * 1/1980 van der Lely et al. .......... 464/32
(Continued)

FOREIGN PATENT DOCUMENTS

DE      1090975      * 10/1960
FR      1 347 634      12/1963
GB      1 589 378      5/1981

OTHER PUBLICATIONS

"Define—Translation." Google.com. [online], [retrieved on Mar. 26, 2015]. Retrieved from the Internet <URL: https://www.google.com/search?q=define%3A+translation&sourceid=ie7&rls=com.microsoft:en-us:IE-Address&ie=&oe=&gws_rd=ssl>.*

(Continued)

*Primary Examiner* — Josh Skroupa
(74) *Attorney, Agent, or Firm* — Oblon, McClelland, Maier & Neustadt, L.L.P.

(57) ABSTRACT

A mechanical protection device including: a transmission shaft having a main axis of rotation and an element that is frangible under a torsional overload; a movable member secured to the transmission shaft to rotate about the main axis and configured to move radially outwards relative to the main axis from a first position to a second position; a spring urging the movable member towards the first position; and a tangential abutment configured to stop rotation of the movable member about the main axis when the movable member is in the second position. The movable member and the spring are calibrated so that from a predetermined trigger angular speed the movable member moves from the first position to the second position under effect of centrifugal force greater than prestress of the spring.

12 Claims, 4 Drawing Sheets

(51) Int. Cl.
    *F04D 13/02*     (2006.01)
    *F04D 27/00*     (2006.01)
    *F04D 29/05*     (2006.01)
    *F16D 127/00*     (2012.01)

(52) U.S. Cl.
    CPC ............ *F04D 27/008* (2013.01); *F04D 29/05* (2013.01); *F16D 9/08* (2013.01); *F16D 2127/002* (2013.01); *Y10T 403/11* (2015.01)

(56) References Cited

U.S. PATENT DOCUMENTS

| | | | |
|---|---|---|---|
| 4,313,712 A | | 2/1982 | Briggs |
| 4,543,074 A * | | 9/1985 | Ville et al. ............ 464/33 |
| 6,059,085 A * | | 5/2000 | Farnsworth ............ 192/55.1 |
| 7,296,670 B2 * | | 11/2007 | Howard et al. ............ 464/32 |
| 2008/0128188 A1 * | | 6/2008 | Giechau ............ 180/65.3 |
| 2009/0139806 A1 | | 6/2009 | Brandt |
| 2010/0219015 A1 | | 9/2010 | Meillet |
| 2010/0219016 A1 | | 9/2010 | Meillet |

OTHER PUBLICATIONS

International Search Report Issued Jul. 26, 2012 in PCT/FR12/50800 Filed Apr. 12, 2012.

* cited by examiner

MECHANICAL PROTECTION DEVICE

The present invention relates to a mechanical protection device, in particular a device for providing mechanical protection against overspeed.

In order to protect devices against mechanical overloads, the person skilled in the art has long been aware of protection devices in which an element in a mechanical transmission system is sacrificed in the event of an overload, so as to avoid more serious damage further downstream in the system. Usually, such devices serve to provide protection against excessive forces or torques. For example, U.S. Pat. Nos. 4,313,712 and 6,042,292 disclose devices for providing mechanical protection against excessive radial forces on rotary shafts. Nevertheless, those prior sacrificial devices present the drawback of not providing protection against overspeeds. In many situations, it can happen that an overspeed can give rise to as much or even more damage than an excessive force or torque. In particular, in certain machines, such as turboshaft engines, for example, overspeed can give rise to a positive feedback phenomenon causing speed to increase progressively until the machine is destroyed.

International patent application WO 2008/101876 discloses a mechanical protection device having a transmission shaft with a resonant frequency in bending that corresponds to a predetermined rotary overspeed of the transmission shaft. In that device, the bending resonance of the transmission shaft serves to absorb the power transmitted in rotation by the transmission shaft, thereby preventing the overspeed from being exceeded. Nevertheless, that is possible only if the available power is limited and the damping in bending of the shaft is sufficient to dissipate all of the available power. If the available power can increase with opposing torque, then the bending resonance of the shaft will not suffice for overcoming it.

The present invention seeks to provide a mechanical protection device comprising a transmission shaft with an element that is frangible under a torsional overload, which device is suitable for providing a mechanical assembly with effective protection against overspeed.

In at least one embodiment, this object is achieved by the fact that the device comprises at least a movable member secured to the transmission shaft to rotate about a main axis and suitable for moving radially outwards relative to the main axis from a first position to a second position, together with a spring urging the movable member towards the first position, and a tangential abutment suitable for stopping the rotation of the movable member about the main axis when the movable member is in the second position. The movable member and the spring are calibrated so that, from a predetermined trigger angular speed, the movable member moves from the first position to the second position under the effect of centrifugal force greater than prestress of the spring.

Thus, the device operates on two principles: a principle of detecting that a threshold speed has been exceeded based on using the centrifugal effect and the prestress of a spring, and a principle of stopping the device based on breaking a frangible section as a result of the triggering due to detecting that a speed threshold has been exceeded. By means of these arrangements, the transmission of power by the mechanical shaft can be interrupted effectively in the event of overspeed, thereby avoiding more severe damage in the mechanical assembly. The impact of the movable member against the tangential abutment causes the transmission shaft to stop and causes the frangible section of the transmission shaft to break immediately, with this being largely independent of the torque being transmitted by the transmission shaft prior to the impact. The prestress of the spring avoids the movable member being moved radially so long as the speed threshold is not reached, thereby presenting the advantage of limiting wear.

The tangential abutment may in particular be a stationary abutment. The movable member may be suitable in pivoting, or else for moving from the first position to the second position in translation, e.g. by sliding in a radial guide.

The invention also provides a machine including a drive shaft, a feed pump, in particular a fuel feed pump, and a mechanical protection device of the invention, wherein the transmission shaft connects the drive shaft to the feed pump in order to actuate the feed pump. Thus, the breaking of the transmission shaft in the event of overspeed of the drive shaft interrupts actuation of the feed pump, thereby having the effect of stopping the machine.

In an additional aspect, said drive shaft is coupled to a turbine configured to be actuated by the expansion of a fluid heated by combustion of the fuel delivered by the feed pump. Thus, in the event of overspeed of the turbine, and thus of the drive shaft and of the transmission shaft, the breaking of the transmission shaft interrupts the feed of fuel to the machine, thereby causing the turbine to stop. Combustion may be internal or external. Thus, by way of example, the turbine may be a gas turbine actuated directly by the gas derived from combustion of the fuel.

The invention also provides a vehicle, in particular an aircraft, including a machine of the invention. For example, the machine may be a turboshaft engine for a rotary wing aircraft.

The invention also provides a method of protecting mechanical protection, which method comprises the following steps in at least one implementation:

at a certain angular speed of a transmission shaft, triggering a movement of a movable member from a first position to a second position that is radially further out relative to the transmission shaft under the effect of a centrifugal force and against a resilient prestress from a spring urging the movable member in the direction opposite to the centrifugal force, the movable member rotating with the transmission shaft;

in the second position, causing the rotating movable member to make contact against a tangential abutment; and breaking a frangible element of the transmission shaft under a torsional overload caused by the movable member making contact against the tangential abutment.

The invention can be well understood and its advantages appear better on reading the following detailed description of three embodiments given as non-limiting examples. The description refers to the accompanying drawings, in which.

Figure 1A:
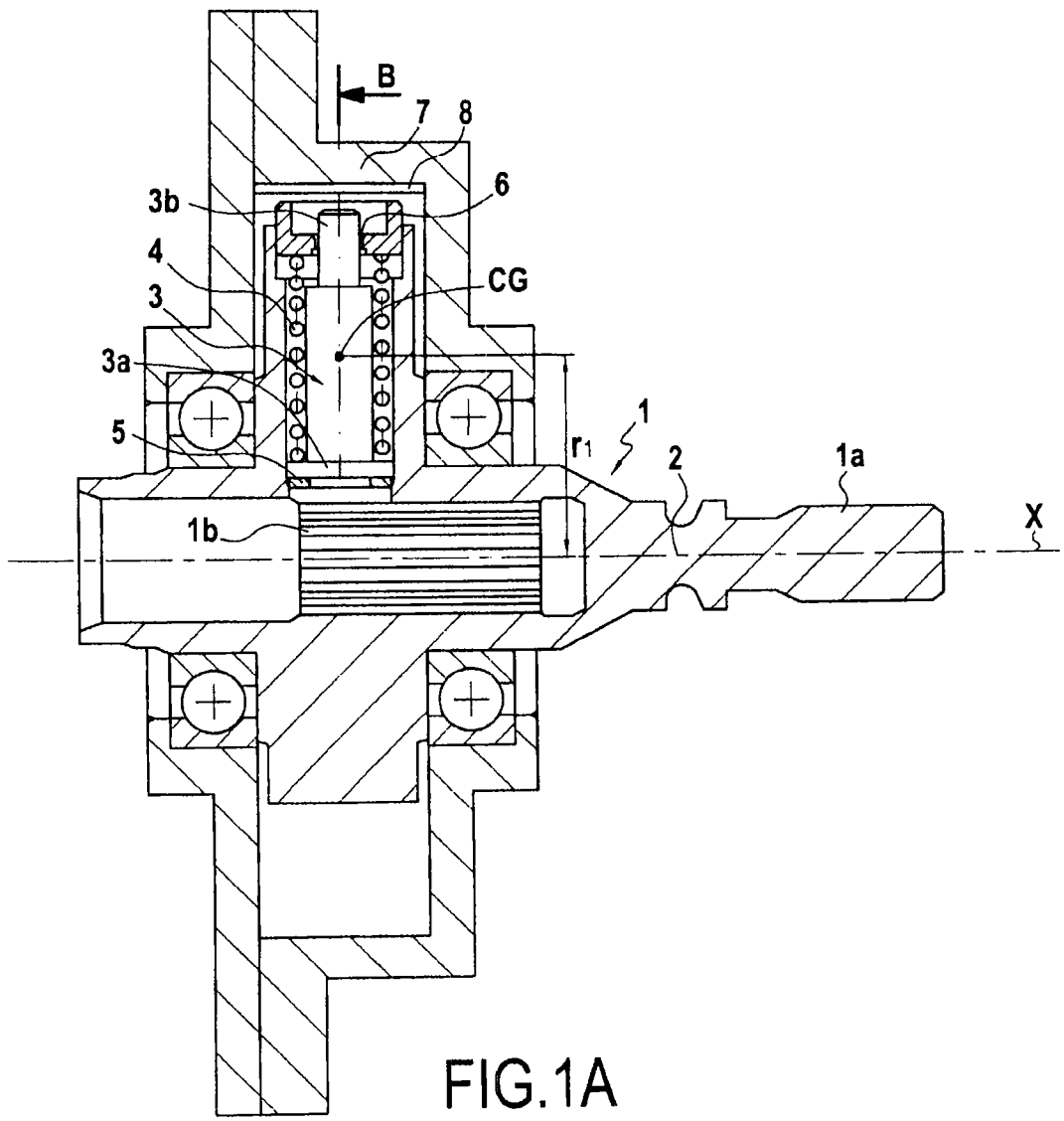
FIG. 1A is a longitudinal section view of a mechanical protection device in a first embodiment.
Figure 1B:
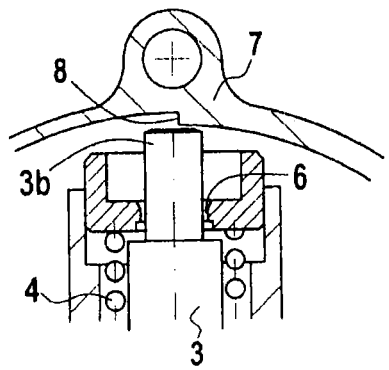
FIGS. 1B and 1C are cross-section views of the FIG. 1A device in two different positions of a movable member.

A mechanical protection device in a first embodiment is shown in FIGS. 1A and 1B. The device comprises a transmission shaft 1 with a first transmission member 1a for coupling the transmission shaft to drive means (not shown), and a second transmission member 1b for coupling the transmission shaft 1 to a device to be driven, a reduced section forming a frangible element 2, and a movable member 3 received in a radial guide 9 incorporated in the transmission shaft 1 in such a manner as to be constrained to rotate with the transmission shaft 1 while remaining movable in a radial direction. A prestress spring 4 presses a proximal end 3a of the movable member 3 against an internal radial abutment 5 towards the axis of rotation X of the transmission shaft 1, while a radial opening 6 allows a distal end 3b of the movable member 3 to pass outwards. As shown in particular in FIG. 1B, a stationary plate 7 is installed around the transmission shaft 1 at the axial position of the movable member 3. In the embodiment shown in FIG. 1B, this stationary plate 7 includes an abutment 8 in a direction tangential to the rotation of the distal end 3b of the movable member 3 about the axis X.

In operation, the rotation of the transmission shaft 1 gives rise to centrifugal force $F_c$ equal to the product of the mass $\underline{m}$ of the movable member 3 multiplied by the radial position $\underline{r}$ of the center of gravity CG of the movable member 3 and by the square of the angular speed $\omega$ of the transmission shaft 1. At the initial radial position of the movable member 3 as shown in FIG. 1A, with the proximal end 3a in contact with the internal abutment 5, and with the center of gravity CG of the movable member 3 in a first radial position $r_1$, the spring 4 exerts resilient prestress $F_1$ in a radial direction towards the axis of rotation X. Consequently, so long as the centrifugal force $F_c$ does not exceed the opposing prestress $F_1$, the proximal end 3a of the movable member 3 remains pressed against the internal radial abutment 5 and the center of gravity CG of the movable member 3 remains in the first radial position $r_1$. Nevertheless, as from an angular speed $\omega_1$, the centrifugal force $F_c$ becomes greater than the prestress $F_1$ and causes the movable member 3 to move outwards. In application of Hooke's law, the resilient force $F_e$ may be approximated by the following formula:

$$F_e = k(r - r_1) + F_1$$

in which $\underline{k}$ is the stiffness coefficient of the spring 4.

For its part, the centrifugal force satisfies the following formula:

$$F_c = m\omega^2 r$$

in which $\underline{m}$ is the mass of the movable member 3, $\omega$ is the angular speed of the transmission shaft, and $\underline{r}$ is the radial distance of the center of gravity of the finger 3 from the axis of rotation X.

Consequently, the angular speed $\omega_1$ for triggering the mechanical protection device can be calibrated by using the following formula:

$$\omega_1 = \sqrt{\frac{F_1}{mr_1}}$$

In order to obtain outward radial acceleration of the movable member 3 as a result of the protection device being triggered, the stiffness coefficient $\underline{k}$ should be less than the quotient of the prestress $F_1$ divided by the initial radial position $r_1$:

$$k < \frac{F_1}{r_1}.$$

Thus, at the trigger angular speed $\omega_1$, the centrifugal force exerted on the movable member exceeds the spring prestress $F_1$ and increases more quickly than the reaction of the spring during the outward radial movement of the movable member.

In order to avoid untimely triggering of the mechanical protection device, it is also appropriate to dimension it in such a manner that it cannot be triggered by vibration or by other external accelerations. For this purpose, the radial distance $r_1$ may satisfy the following equation:

$$r_1 \geq \frac{K\gamma}{\omega_n^2}$$

in which $\gamma$ represents a predetermined external acceleration, K represents a safety factor, and $\omega_n$ represents a nominal angular speed of the transmission shaft that is less than the trigger angular speed.

The mass $\underline{m}$ and the initial position $r_1$ of the movable member 3, and the stiffness $\underline{k}$ and the prestress $F_1$ of the spring 4 can thus be calibrated on the basis of these formulas in order to trigger the protection device at a critical speed $\omega_1$ that exceeds the nominal speed $\omega_n$ of the transmission shaft 1 by a predetermined overspeed $\Delta\omega$. After such triggering, the movable member 3 moves towards a second position situated radially further out than the first position.

Figure 1C:
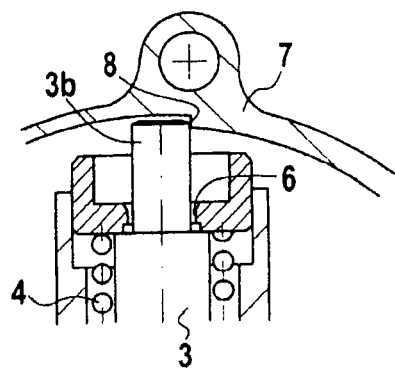

After the movable member 3 has moved to the second position, the transmission shaft 1 can perform at most one complete turn before the distal end 3b of the rotating movable member 3 strikes a tangential abutment 8 of the stationary peripheral element 7 as shown in FIG. 1C. The impact of the distal end 3b of the movable member 3 against the tangential abutment 8 stops the rotation of the transmission shaft 1 suddenly, thereby generating an instantaneous torsional overload on the transmission shaft 1 and breaking the frangible element 2 that is located axially between the first coupling member 1a and the movable member 3. The transmission shaft 1 thus acts as a sacrificial mechanical protection member, not only against excess force or torque, but also against excess speed $\Delta\omega$.

Figure 2:
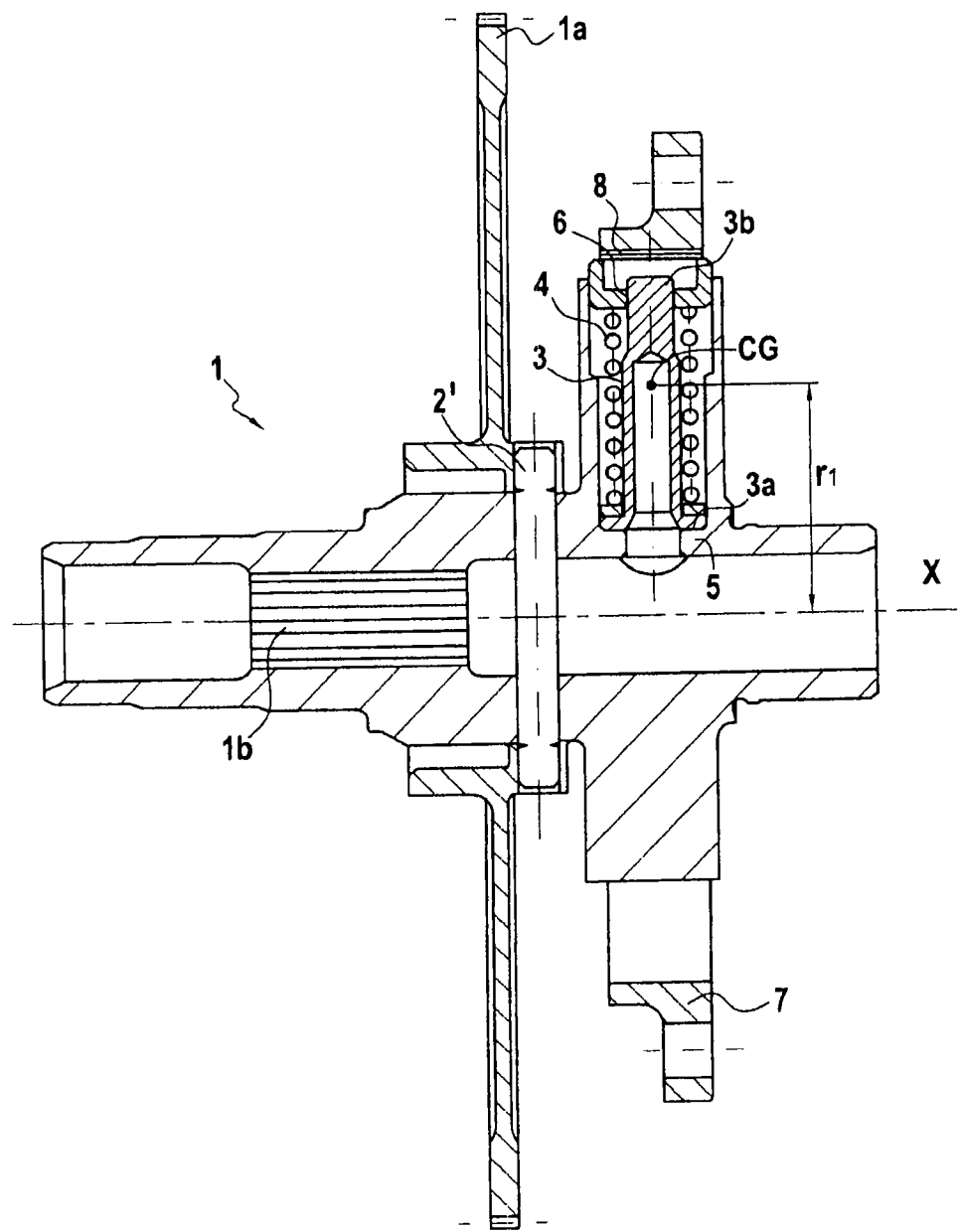
FIG. 2 is a longitudinal section view of a mechanical protection device in a second embodiment.

In a second embodiment, shown in FIG. 2, the frangible element 2 is not formed by a reduced section of the transmission shaft 1, but by a pin 2' that is frangible in shear, and that connects together two separate segments 1a and 1b of the transmission shaft 1. The other elements of the mechanical protection device in this second embodiment are substantially functionally equivalent to those of the first embodiment, and they are given the same reference numbers.

Although it is centrifugal force that is used in these first and second embodiments to cause the movable member 3 to move radially by sliding in a radial guide 9 incorporated in the power transmission shaft 1, it is possible to envisage alternatives. Thus, in a third embodiment, shown in FIGS. 3A and 3B, and in a form analogous to a Watt regulator with pivoting flyweights, the mechanical protection device has two movable members 3, each mounted to pivot in a longitudinal plane relative to the transmission shaft 1. The two movable members 3 are L-shaped, each with a proximal end 3a on a first segment, a distal end 3b on a second segment, and a pivot P at the substantially right-angled corner between the first and second segments. Thus, in the first position shown in FIG. 3A, the first segment of each movable member is oriented in a direction that is substantially radial and its second segment is oriented in a direction that is substantially longitudinal, thereby enabling the spring 4 to be arranged in a longitudinal direction inside the transmission shaft 1. The spring 4 is prestressed so that, in this first position, it presses an inside face of the distal end 3b of each movable member 3 towards the axis of rotation X of the transmission shaft 1 and against an internal radial abutment 5.

Figure 3A:
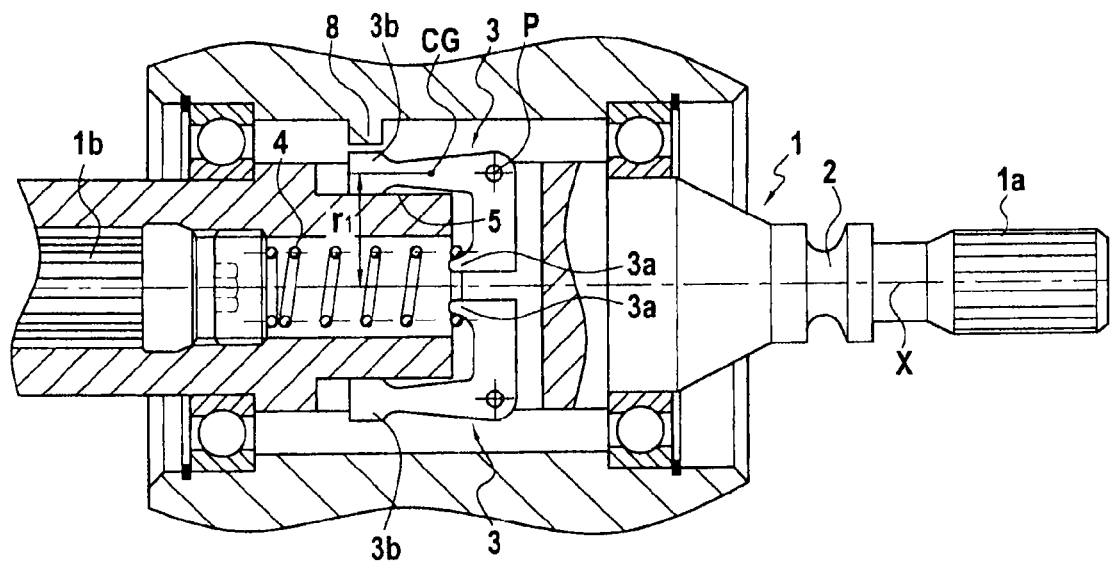
FIG. 3A is a longitudinal section view of a mechanical protection device in a third embodiment.
Figure 3B:
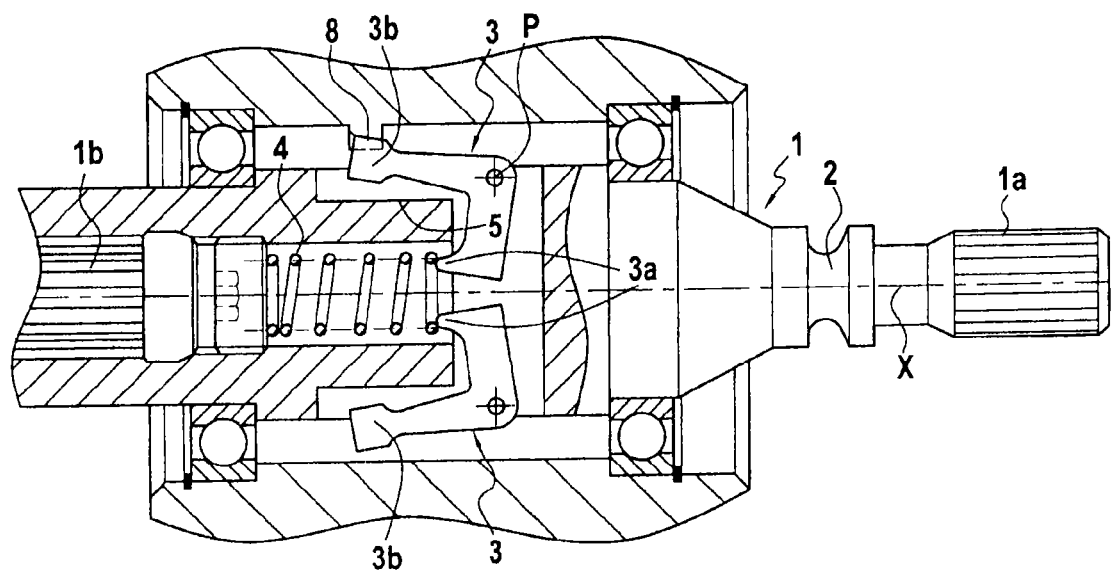
FIG. 3B is a detail view of the FIG. 3A device with a movable member in a second position.

In operation, the rotation of the transmission shaft 1 in this third embodiment gives rise to centrifugal force $F_c$ on each movable member 3 that is equal to the product of the mass $\underline{m}$ of the movable member 3 multiplied by the radial position $\underline{r}$ of the center of gravity CG of the movable member 3 and by the square of the angular speed $\omega$ of the transmission shaft 1. This centrifugal force $F_c$ gives rise to a pivoting torque $M_c$ equal to the product of the centrifugal force multiplied by the longitudinal distance L of the center of gravity CG from the pivot P. when the movable members 3 are in the initial position as shown in FIG. 3A, with each movable member 3 in contact with the internal abutment 5, and with the center of gravity CG of each movable member 3 in a first radial position $r_1$, the spring 4 exerts resilient prestress $F_1$ along the direction of the axis of rotation X against the two movable members 3. This resilient prestress $F_1$ gives rise to a pivoting torque $M_1$ against each movable member 3 opposing the centrifugal pivoting torque $M_c$. Consequently, so long as the centrifugal pivoting torque $M_c$ does not exceed the opposing pivoting torque $M_1$ generated by the prestress $F_1$, the distal end 3b of the movable member 3 remains pressed against the internal radial abutment 5 and the center of gravity CG of the movable member 3 remains in the first radial position $r_1$. Nevertheless, as from an angular speed $\omega_1$, the centrifugal torque $M_c$ becomes greater than the prestress torque $F_1$ and causes the movable member 3 to pivot outwards. In application of Hooke's law, the resilient force $F_e$ exerted by the spring 4 on the two movable members 3 can be approximated by the following formula:

$$F_e = kx + F_1$$

in which $\underline{k}$ is the stiffness coefficient of the spring 4 and $\underline{x}$ is the distance through which the spring 4 has been compressed from the initial position shown in FIG. 3A.

For its part, the centrifugal force exerted on each movable member 3 satisfies the following formula:

$$F_c = m\omega^2 r$$

in which $\underline{m}$ is the mass of each movable member 3, $\omega$ is the angular speed of the transmission shaft, and $\underline{r}$ is the radial distance of the center of gravity of each movable member 3 from the axis of rotation X.

If the movable members 3 are substantially identical, and if their points of contact with the spring 4 are at a radial distance l from the pivot P, the angular speed $\omega_1$ for triggering the mechanical protection device can be calibrated using the following formula:

$$\omega_1 = \sqrt{\frac{F_1 \ell}{N m r_1 L}}$$

in which N represents the number of movable members 3 (in the embodiment shown, N=2).

In order to obtain outward radial acceleration of the movable member 3 as a result of the protection device being triggered, the stiffness coefficient $\underline{k}$ should be less than the quotient of the prestress $F_1$ divided by the initial radial position $r_1$:

$$k < \frac{F_1}{r_1}$$

As in the first and second embodiments, in order to avoid untimely triggering of the mechanical protection device, the radial distance $r_1$ may satisfy the following equation:

$$r_1 \geq \frac{K\gamma}{\omega_n^2}$$

in which $\gamma$ represents a predetermined external acceleration, K represents a safety factor, and $\omega_n$ represents a nominal angular speed of the transmission shaft that is less than the trigger angular speed.

The movable members 3 and the spring 4 in this third embodiment can thus likewise be calibrated on the basis of these formulas in order to trigger the protection device at a critical speed $\omega_1$ that exceeds the nominal speed $\omega_n$ of the transmission shaft 1 by a predetermined overspeed $\Delta\omega$. After such triggering, the movable member 3 moves towards a second position situated radially further out than the first position and shown in FIG. 3B.

After the movable member 3 has moved to the second position, the transmission shaft 1 can perform at most half a turn before the distal end 3b of one of the two movable members 3 rotating about the main axis X strikes against the tangential abutment 8. The impact of the distal end 3b of the movable member 3 against the tangential abutment 8 gives rise to an instantaneous torsional overload on the transmission shaft 1, thereby breaking the frangible element 2 that is arranged axially between the first coupling member 1a and the movable member 3.

Figure 4A:
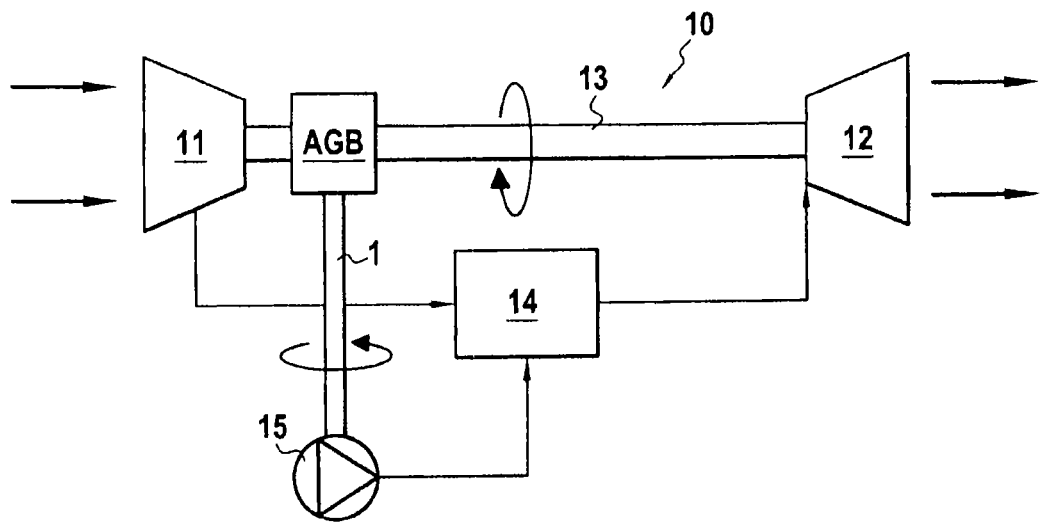
FIG. 4A is a diagram illustrating a turboshaft engine including the mechanical protection device of FIGS. 1A to 1C.

An example application of the mechanical protection device in accordance with any one of the first preferred embodiments is shown in FIG. 4A. In this example, a device such as one of those shown in the above figures is used to protect a turboshaft engine 10 against an overspeed $\Delta\omega$. The turboshaft engine 10 comprises a compressor 11 and a turbine 12 that are connected together by a drive shaft 13, together with a combustion chamber 14 that is fed with fuel by a feed pump 15. Air compressed by the compressor 11 is delivered to the combustion chamber 14, and the expansion of hot combustion gas in the turbine 12 serves to actuate the drive shaft 13 with a large surface of power compared to the power required for actuating the compressor 11. The drive shaft 13 can thus be connected to other mechanical devices in order to drive them, such as the rotor of a helicopter, for example.

In the turboshaft engine 10 shown, the transmission shaft 1 is coupled to the drive shaft 13 via an accessory gearbox AGB. The transmission shaft 1 is also coupled to the feed pump 15 in order to drive it. In this way, in operation, power is taken from the drive shaft 13 via the transmission shaft 1 in order to feed fuel to the combustion chamber 14.

Figure 4B:
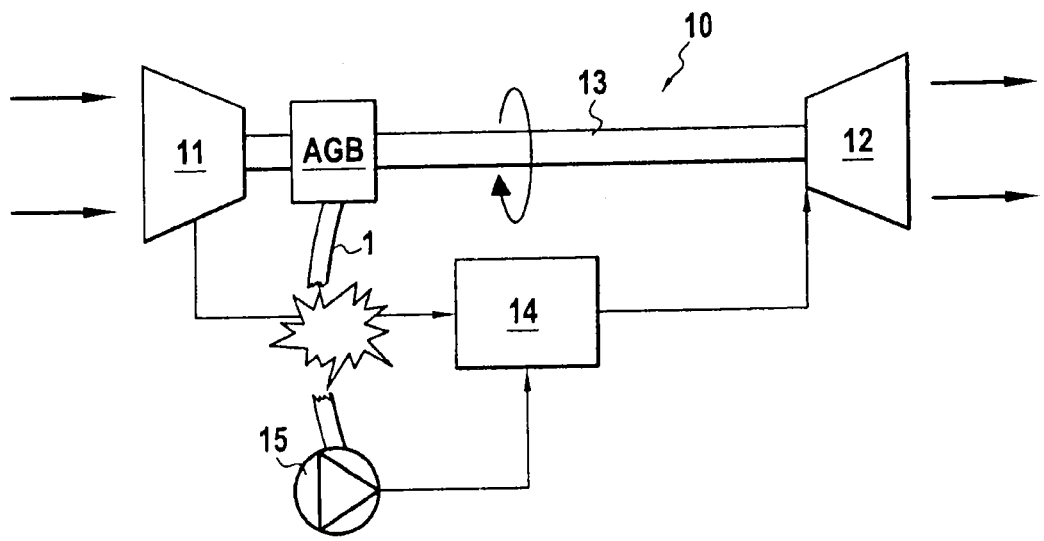
FIG. 4B is a diagram illustrating the FIG. 4A turboshaft engine in the event of the transmission shaft of the mechanical protection device breaking.

If a predetermined overspeed of the drive shaft 13 is reached, the transmission shaft 1 reaches the critical speed $\omega_1$ and breaks at the frangible section 2. Actuation of the feed pump 15 is thus interrupted, as shown in FIG. 4B, and the supply of fuel to the combustion chamber 14 stops. Since it is no longer fed with fuel, the turboshaft engine 10 ceases to produce power for actuating the drive shaft 13, thereby preventing runaway of the drive shaft 13.

Although the present invention is described above with reference to specific embodiments, it is clear that various modifications and changes can be made to those embodiments without departing from the general ambit of the invention as defined by the claims. In particular, individual characteristics of the various embodiments shown may be combined to produce additional embodiments. Consequently, the description and the drawings should be considered as being illustrative rather than restrictive.

The invention claimed is:

1. A mechanical protection device comprising:
   a transmission shaft including a frangible element that is breakable under a torsional overload;
   a movable member secured to the transmission shaft to rotate about a main axis and configured to move radially outwards relative to the main axis from a first position to a second position;
   a spring urging the movable member towards the first position; and
   a tangential abutment configured to stop rotation of the movable member about the main axis when the movable member is in the second position; and
   wherein the movable member and the spring are calibrated so that, from a predetermined trigger angular speed, the movable member moves from the first position to the second position under effect of centrifugal force greater than prestress of the spring such that the tangential abutment stops rotation of the transmission shaft causing said torsional overload to break the frangible element.

2. A mechanical protection device according to claim 1, wherein the movable member is configured to move from the first position to the second position in translation.

3. A mechanical protection device according to claim 1, wherein the movable member is configured to move from the first position to the second position in pivoting.

4. A machine comprising a drive shaft, a feed pump, and a mechanical protection device according to claim 1, wherein the transmission shaft connects the drive shaft to the feed pump to actuate the feed pump.

5. A machine according to claim 4, wherein the feed pump is a fuel feed pump.

6. A machine according to claim 5, wherein the drive shaft is coupled to a turbine configured to be actuated by expansion of a fluid heated by combustion of the fuel.

7. A mechanical protection device according to claim 1, wherein said predetermined trigger angular speed is in a drive direction of the transmission shaft.

8. A mechanical protection method comprising:
   at a certain angular speed of a transmission shaft, triggering a movement of a movable member from a first position to a second position that is radially further out relative to the transmission shaft under effect of a centrifugal force and against a resilient prestress from a spring urging the movable member in the direction opposite to the centrifugal force, the movable member rotating with the transmission shaft;
   in the second position, causing the rotating movable member to make contact against one or more tangential abutments; and
   breaking a frangible element of the transmission shaft under a torsional overload caused by the movable member making contact against the tangential abutment.

9. A mechanical protection method according to claim 8, wherein the transmission shaft transmits rotation from a drive shaft to a feed pump.

10. A mechanical protection method according to claim 9, wherein the feed pump feeds fuel to combustion delivering heat energy suitable for causing the drive shaft to rotate.

11. A mechanical protection method according to claim 10, wherein the drive shaft is actuated by a turbine, the turbine being actuated in turn by expansion of a fluid heated by the combustion.

12. A mechanical protection method according to claim 8, wherein said certain angular speed is in a drive direction of the transmission shaft.

* * * * *